United States Patent

[11] 3,622,230

[72] Inventor Joseph G. Dimmick
1009 Beech St., Annapolis, Md. 21401
[21] Appl. No. 825,703
[22] Filed May 19, 1969
[45] Patented Nov. 23, 1971

[54] FLEXIBLE MIMIC DISPLAY SYSTEM
4 Claims, 1 Drawing Fig.
[52] U.S. Cl..................................................... 353/122,
33/25, 33/28
[51] Int. Cl....................................................... G03b 21/00
[50] Field of Search............................................ 340/324.1,
334; 353/122, 30, 28, 25

[56] References Cited
UNITED STATES PATENTS
3,387,084 6/1968 Hine et al. .................. 340/324.1

Primary Examiner—Harry N. Haroian
Attorneys—L. A. Miller, Q. E. Hodges and A. Sopp ABSTRACT: A system for simultaneously displaying on one panel different types of dynamic and static data, wherein for each piece of static data concerning a prime system component that is presented, there exists a piece of dynamic data concerning the same prime system component which is presented in such a manner that said dynamic data is displayed in the same specific location on the panel as the associated piece of static data.

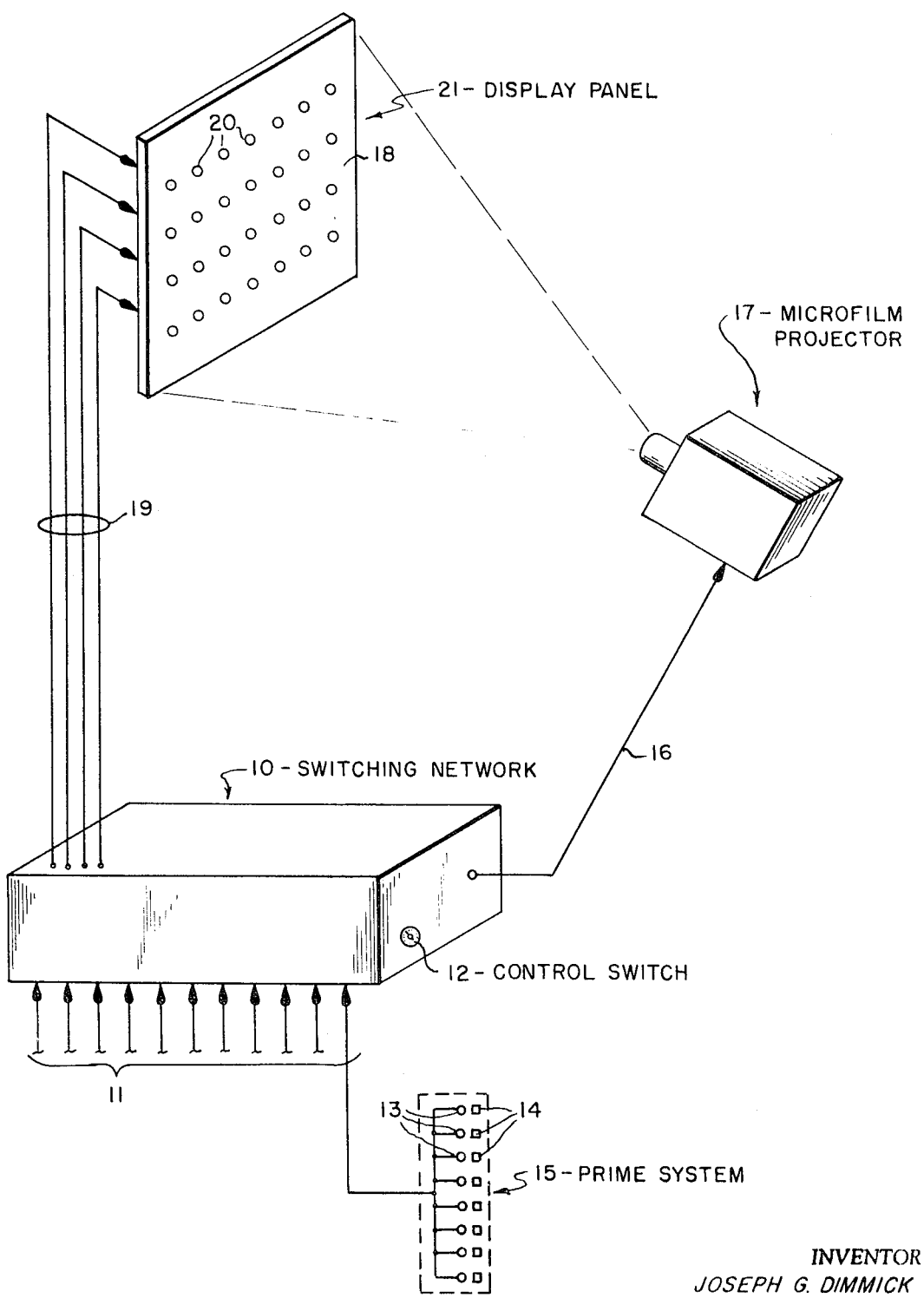

FLEXIBLE MIMIC DISPLAY SYSTEM

BACKGROUND OF THE INVENTION

The present invention relates to a display system and is concerned with simultaneously displaying on the same panel large amounts of dynamic and static data depicting information about various prime systems.

Past methods of displaying such data have involved either a separate mimic display for each monitored prime system or a CRT display. Previous mimic displays have always involved a separate display panel with its associated lamps or other indicating devices devoted to each prime system. A typical mimic display consists of a translucent or opaque front panel on which the static data, usually in the form of a schematic diagram of the prime system, is inscribed, and a set of indicating lights for displaying the dynamic information about the individual prime system components of interest. Each indicator is located at or near the diagram symbol corresponding to the prime system component with which it is associated. The use of each indicator light and each display front panel is therefore fixed for the life of the display.

CRT displays are fully capable of performing functions similar to that of the instant invention but are much more expensive, complicated, and susceptible to damage.

Several possible schemes exist, involving rearport CRT's, digital computers, and simultaneous displays from two or more sources such as a digital computer and a television camera.

Labeled indicators which do not show the interconnections of the components have also been used, but heavy reliance must be placed on training and memory in order that the viewer grasp the significance of the information.

SUMMARY

The instant invention solves the aforementioned problems and disadvantages of the prior art by providing a display system which fills the gap between the low cost but severly limited capabilities of conventional mimic display devices and the highly flexible but extremely expensive CRT systems. To accomplish the hereinbefore-mentioned purpose the flexible mimic display system comprises a switching network, a control switching means, a matrix of indicator lights mounted on a projection screen, the combination of which constitutes a display panel, and a microfilm projector, whereby different types of dynamic and static data may be simultaneously displayed on the same panel.

Accordingly, it is an object of the present invention to provide a system which simultaneously displays different types of dynamic and static data on the same panel.

Another object is to provide for periodic monitoring of the condition of various prime systems and to allow for displaying in a clearly readable manner the results of such an examination.

A further object of the invention is to provide a system which automatically scans various areas being sensed and displays information concerning the condition of said areas. Other objects and features of the invention will become apparent to those skilled in the art as the disclosure is made in the following detailed description of the preferred embodiment of the invention as illustrated in the accompanying sheet of drawings in which:

BRIEF DESCRIPTION OF THE DRAWING

The sole FIGURE is a schematic and block diagram representative of the essential components of the invention.

DESCRIPTION OF THE PREFERRED EMBODIMENT

In the sole FIGURE, the reference numeral 10 designates a selective switching network of any suitable conventional type well known in the art, as for example, a rotor switch, a key board, a digital logic network, etc. Connected to the switching network 10 are two inputs; the first input coming from prime system sensor bundles 11 and the second input coming from display selection control switch 12. Each of the prime system sensor bundles 11 contains many leads or wires, every one of which is connected to a sensor within the group of sensors indicated by the numeral 13. Sensors 13 detect particular conditions concerning the prime system components 14 and all of said components comprise the prime system 15.

For example, but in no way limiting the scope of the instant invention, prime system 15 represents all of the steam pipes in one compartment of a ship; prime system components 14 are sections of the steam pipes which run through said compartment of the ship; sensors 13 are temperature responsive cells which produce electrical responses when the temperature rises above a certain level, and prime system sensor bundle 11 is a conduit containing all the wires connected to each sensor 13. Therefore, in this example, the leads in bundle 11 contain all the responses (dynamic data) from the sensors 13 concerning, say, the temperature of particular steam pipes in a particular compartment. Obviously, the sensors may sense different parameters, such as: steam pipe temperature, pressure, or other variable conditions all being sensed in the same compartment; steam pipe temperature being sensed in many different compartments; steam pipe temperature, pressure, or other variable conditions all being sensed in many different compartments; etc. Consequently, each prime system sensor bundle 11 contains information or data about the conditions of certain prime system components.

The second input connected to switching network 10 comes from display selection control switch 12. Said switch contains a number of different selection channels and by selecting a particular one, the switching network 10 is supplied with a particular input which is related to a particular prime system. The switching network 10 is constructed so that for each selection channel appearing on the display selection control switch 12, there is provided a corresponding switching circuit. Accordingly, by selecting a particular channel on control switch 12, an input signal is directed to switching network 10 so that said switching network is instructed to select an appropriate switching circuit and said switching circuit controls two output signals originating from said switching network. Said control switch 12 can be operated either manually or automatically and by way of example may be a stepping switch.

The first output signal from the switching network 10 travels along wire or lead 16 to energize microfilm projector 17 to select a particular microfilm frame therein. Since said signal is determined by a particular switching circuit of switching network 10 and said switching circuit is determined by which channel the display selection control switch 12 is set to, the control switch determines said output signal. Consequently, by selecting a particular channel on said control switch 12, a particular switching circuit in said switching network 10 related to a particular prime system is actuated and an output signal is produced which energizes said projector 17 so that a particular microfilm frame related to the same prime system is brought into alignment for projection onto screen 18. Accordingly, for each separate channel on said control switch 12, said projector 13 contains a particular microfilm frame which can be brought into place and visually displayed.

Each microfilm frame contains information (static data) concerning a particular prime system. For example, but in no way limiting the scope of the instant invention, the microfilm frame could be a schematic representation of the arrangement of steam pipes in a compartment of a ship and the placement of various temperature sensors in respect to said steam pipes. By selecting a different channel on display selection control switch 12, a new microfilm frame is moved into position and a different schematic is displayed on screen 18 which, for example, could show the placement of various pressure sensors in respect to said steam pipes.

The second output signal from switching network 10 travels along wires 19 to matrix of indicators 20 for energizing specific indicators. Said output signal is controlled by a switching circuit of switching network 10 which is responsible for connecting certain indicators to certain prime system component sensors. It is apparent that the matrix can be constructed with any number, type, or array of indicators that one desires. For example said indicators can be incandescent lamps, discharge tubes, electroluminescent cells, etc., or depending upon the desired complexity of the display device said indicators can be modular gauges in any combination such as dials, alphanumeric devices, symbol generators, etc.

The matrix of indicators 20 in combination with the screen 18 comprises the display panel 21. The screen and matrix can be combined in any desired manner so that the static data represented by an image coming coming from projector 17 is superimposed over the dynamic data represented by the matrix of indicators 20. For example said display panel 15 could comprise an opaque screen with protruding indicators or a translucent screen with indicators behind it.

Accordingly, the display panel is arranged so that for each prime system component image projected onto the screen, there exists an individual indicator positioned at the very same location and, due to the switching network's operation, said indicator is capable of displaying the condition of the actual prime system component being depicted by said image. By way of additional example, the switching may be carried out by ganged rotary switches one of which couples appropriate driving signals to position the projector microfilm and the other of which simultaneously selects the group of leads for the prime system depicted by the microfilm as well as the display indicators associated with the sensors.

DESCRIPTION OF THE OPERATION

In operation, when selection control switch 11 is actuated, a signal is sent from switching network 10 to microfilm projector 17, whereby a particular microfilm frame is aligned for projection onto screen 18. The microfilm frame represents static data in the form of a schematic or other prime system component diagram. The static data is arranged so that the projected image of each prime system component corresponds to the location of an indicator on the panel. Indicators 20 are connected to prime system component sensors 13 via switching network 10 and by operating said lights in only an on/off mode, one bit of dynamic data detected by the sensors may be presented for each prime system component. Use of additional indicator operating modes, such as flashing, intensity, etc. increases the amount of information per indicator.

Accordingly, selecting a microfilm frame causes switching network 10 to connect each indicator which schematically represents a prime system component to the appropriate sensor which is detecting the condition of the actual prime system component. Therefore, a schematic diagram of the entire prime system is projected onto the display panel with the status of each prime system component being depicted by an appropriate indicator. Consequently, by selecting a different frame, the switching network causes certain indicators to be connected to a different set of sensors and a new prime system is visually displayed.

Therefore, the instant invention can be considered an information multiplexer in that it allows periodic monitoring of the status of many prime systems and their components. If desired the monitoring can be done manually at the will of an operator or it can be done automatically by utilizing a stepping-type selection control switch so that at the end of a predetermined time period said switch is automatically moved to the next channel. Monitoring automatically provides for the display system the capability of scanning many prime systems and produces visual information concerning the status of components within each of said scanned prime systems.

Consequently it is clear that the principal advantage of the instant invention is that information concerning the conditions of prime system components previously attainable only at the expense of high cost, small display area and excessive weight, is now available without the disadvantages of prior known display systems. An additional advantage is that depending on the installation, spare frame capacity may be used for storage of data which is necessary only in static form such as procedures, lists, instructions and normal operating characteristics. A further advantage is that the display panel may be made much larger than a CRT and consequently viewed by large groups.

Obviously many modifications and variations of the present invention are possible in the light of the above teachings.

What is claimed is:

1. A flexible mimic display system for simultaneously displaying different dynamic and static data concerning and identifying prime system components on the same display panel, comprising:
   a plurality of sensing means for determining data concerning the condition of a plurality of prime systems and producing an input signal representative of the condition;
   switching means for receiving the signal from the sensing means to produce a first and second output signal therefrom;
   projection means including a projector containing a plurality of microfilm frames which can be selectively, optically projected in response to the first output signal;
   display panel means including a screen upon which an image can be projected having a matrix of indicators mounted therein which are selectively excited in response to the second output signal; and
   selection control means including a switch which selectively feeds the input signal from a prime system to the switching means which feeds the first output signal therefrom to the projector to select the microfilm frame corresponding to the prime system and which feeds the second output signal to the matrix of indicators to actuate those indicators corresponding to the prime system.

2. A system as claim in claim 1, wherein said selection control means comprises a stepping switch so that different channels can be automatically selected and different data concerning and identifying prime system components can be automatically chosen and displayed sequentially.

3. A method of displaying dynamic and static data concerning and identifying prime system components on the same display panel, comprising the steps of:
   sensing dynamic data concerning the condition of prime systems and producing as input signal therefrom;
   generating a first and second output signal from the input signal;
   optically projecting one of a plurality of microfilm frames in response to the first output signal;
   simultaneously displaying the second output signal on a matrix of indicators and the optically projected microfilm frame thereover on a common surface; and
   selectively feeding the input signal from a prime system to be generated into the first and second output signals.

4. A method as claimed in claim 3 in which:
   said selecting step is performed automatically and thereby producing a sequential scan of different dynamic and static data concerning and identifying certain prime system components.

* * * * *